United States Patent [19]

Muenzer et al.

[11] Patent Number: 4,781,423

[45] Date of Patent: Nov. 1, 1988

[54] ADAPTABLE CASSETTE AND DISC PACK STORAGE SYSTEM

[75] Inventors: Kimberlee K. Muenzer, La Crescenta; Spencer L. Mackay, Agoura Hills, both of Calif.

[73] Assignee: Certron Corporation, Anaheim, Calif.

[21] Appl. No.: 43,649

[22] Filed: Apr. 28, 1987

[51] Int. Cl.[4] .............................................. A47G 19/08
[52] U.S. Cl. ..................................... 312/183; 211/41; 206/387; 220/22.1
[58] Field of Search ..................... 312/183, 9, 10, 350; 211/184, 40, 41; 206/387, 425; 220/221.1, 22.2, 22.3

[56] References Cited

U.S. PATENT DOCUMENTS

| 570,338 | 10/1896 | Reed | 211/184 X |
|---|---|---|---|
| 1,273,894 | 7/1918 | Madison | 211/184 X |
| 4,440,458 | 4/1984 | Berkman | 312/10 |
| 4,453,785 | 6/1984 | Smith | 312/10 |
| 4,544,213 | 10/1985 | Long et al. | 220/22.3 |
| 4,545,484 | 10/1985 | Rohner | 206/425 |

FOREIGN PATENT DOCUMENTS 185893  8/1936  Sweden .................. 312/183

Primary Examiner—Joseph Falk
Attorney, Agent, or Firm—Freilich, Hornbaker, Rosen & Fernandez

[57] ABSTRACT

A storage system is provided which can effectively store a variety of magnetic storage elements such as VHS video cassette packs, standard audio cassette packs, Beta video cassette packs, 5¼" floppy disc packs, and CD (compact disc) packs alternately in a given space in a drawer. The drawer has opposite sides with vertical tabs spaced along each side to form spaces that closely receive opposite ends of a VHS cassette pack. A pair of cassette adaptors can each lie in spaces otherwise occupied by a VHS cassette pack, the adaptors having vertical ribs that store standard audio cassettes in an orientation perpendicular to that of the VHS cassettes. A pair of disc pack adaptors can be mounted at opposite sides of the drawer, these adaptors having walls forming wide slots for holding CD disc packs and narrower slots at the bottom of the wide slots for holding 5¼" floppy disc packs. The disc pack adaptors hold the disc packs at an incline from the vertical to reduce their height and facilitate reading of titles. The adaptors can be switched to angle the different disc packs in opposite directions from the vertical.

7 Claims, 4 Drawing Sheets

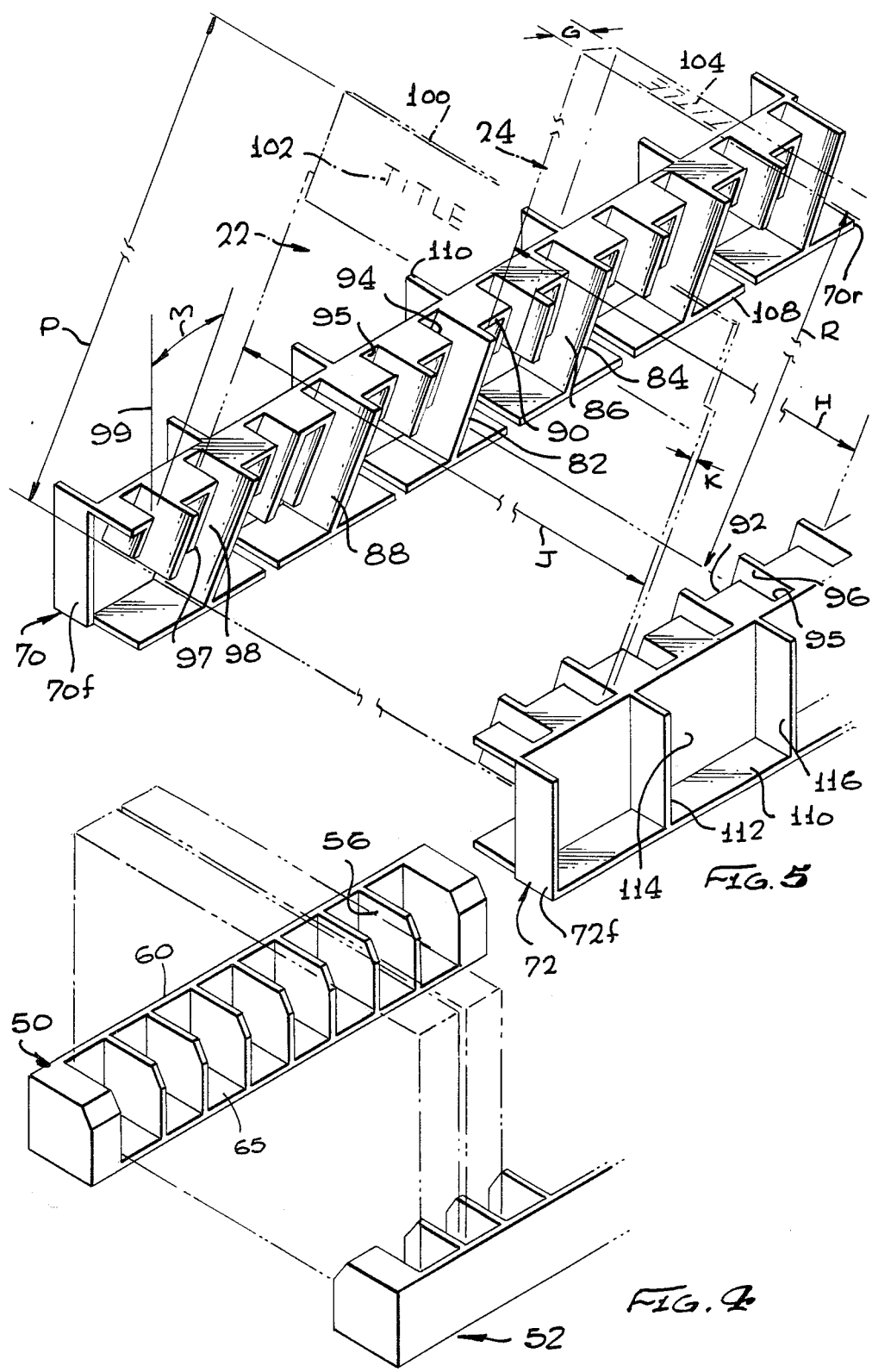

ADAPTABLE CASSETTE AND DISC PACK STORAGE SYSTEM

BACKGROUND OF THE INVENTION

Several types of machine-readable replaceable information storage devices are commonly used, which should be carefully stored to avoid damage. At present, the most common of these devices are VHS video cassettes, Beta video cassettes, standard audio cassettes, 5¼" floppy discs, and CD discs, all of which are usually stored in a box or sleeve type package or pack. The cassette or disc, whether packaged or not, can sometimes be referred to as a cassette or disc pack. There have been attempts to provide a storage drawer or other platform which could store two or more different types of information storage devices, but they have generally resulted in considerable wasted space and/or required complex storage drawers. A storage system which enabled commonly available information storage devices to be alternately stored in a drawer system of relatively simple design, in a compact and efficient manner, would be of considerable value.

SUMMARY OF THE INVENTION

In accordance with one embodiment of the present invention, a system is provided for efficiently storing common information storage devices in a relatively simple and compact manner. The system can include a drawer or other platform which has largely vertical tabs along either side holding cassette packs of a first side which extend across the width of the drawer. Cassette adaptors can be provided which each fit in a space otherwise occupied by a first cassette, the adaptors having largely vertical ribs which hold cassette packs of a second size in orientations perpendicular to those of the first cassettes. Disc pack adaptors can also be provided which detachably mount at opposite sides of the drawer to hold disc packs. The disc pack adaptors can be constructed to hold disc packs at an angle from the vertical, to reduce the occupied height above the drawer and/or facilitate reading of titles. The disc pack adaptors can be constructed with wide slots for holding CD disc packs and narrower slots for holding 5¼" floppy disc packs.

The novel features of the invention are set forth with particularity in the appended claims. The invention will be best understood from the following description when read in conjunction with the accompanying drawings.

BRIEF DESCRIPTION OF THE DRAWINGS

FIG. 4 is a partial perspective view of the system of FIG. 2, showing a pair of cassette adaptors and indicating how they store standard audio cassette packs between them.

FIG. 5 is a partial perspective view of a pair of disc pack adaptors, showing how they can be used to store two types of disc packs.

DESCRIPTION OF THE PREFERRED EMBODIMENTS

Figure 1:
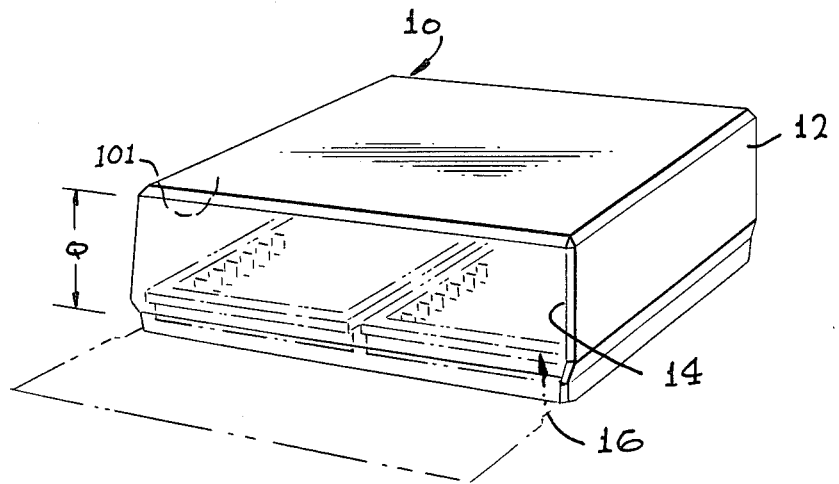
FIG. 1 is a perspective view of a storage system constructed in accordance with the present invention.
Figure 2:
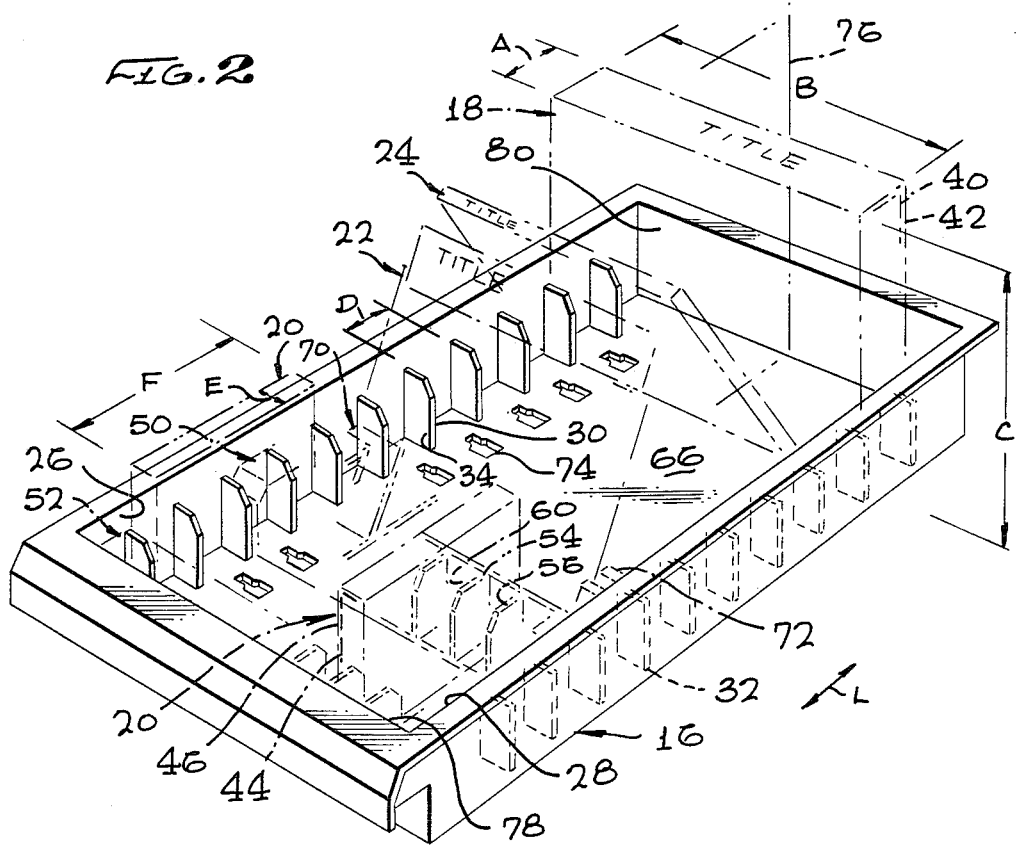
FIG. 2 is a perspecitive view of a drawer of the system of FIG. 1, showing various information storage devices stored therein.

FIG. 1 illustrates a storage system 10 which includes a cabinet 12 having an openable front 14, and which can hold two pullout drawers 16. Each drawer or frame 16 is capable of holding several different types of replaceable machine-readable information storage devices. FIG. 2 shows the manner in which VHS cassette packs 18, audio cassette packs 20, 5¼" floppy disc packs 22, and CD disc packs 24 can alternatively be stored in the same space on the drawer. The drawer has opposite sides 26, 28 and has several substantially vertical tabs 30, 32 at each side, that are spaced apart to leave first spaces 34.

The VHS cassette pack 18 has a thickness or width A, a length B, and a height C. The width D of the spaces 34 between the tabs are about the same as the width A of the VHS pack, so each end of the pack is closely received in the space between a pair of tabs (or between an end wall such as 80 and a tab). The distance between the opposite sides of the drawer is about the same as the length B of the VHS pack, so that pack is closely received in the spaces at opposite sides of the drawer. It may be noted that the VHS cassette pack usually includes a VHS cassette 40 and a box or package 42 which surrounds it, and is generally referred to herein as a VHS cassette pack.

An audio cassette pack (which usually includes an audio cassette 44 and a box or package 46) can be stored in the drawer by the use of a pair of substantially identical cassette adaptors indicated at 50, 52. Each adaptor such as 50 includes a group of substantially vertical ribs 54 spaced apart to leave slots or spaces 56 that are about equal to the width E of an audio cassette pack, to closely receive an end of it. Each of the adaptors fits into a pair of spaces 34 between tabs at opposite sides of the drawer, to lie in a region that may otherwise by occupied by a VHS cassette pack. The two adaptors 50, 52 are installed in spaces 34 that are spaced apart along the length L of the drawer so the slot-bottom walls 60 formed on the adaptors between their ribs are spaced to closely receive an audio cassette between the two adaptors.

Figure 3:
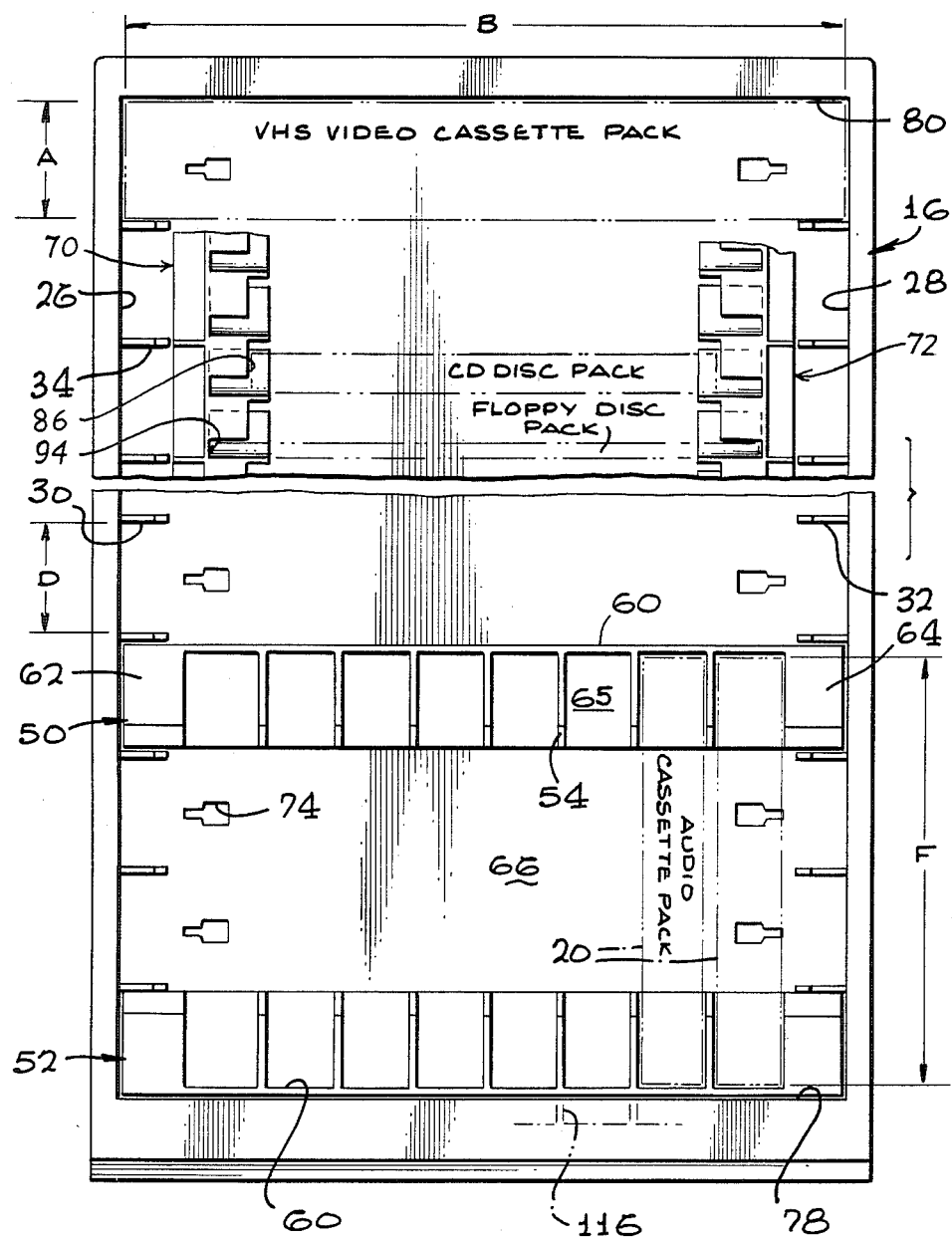
FIG. 3 is a partial plan view of the drawer of FIG. 2, showing how the various storage devices can be held.
Figure 6:
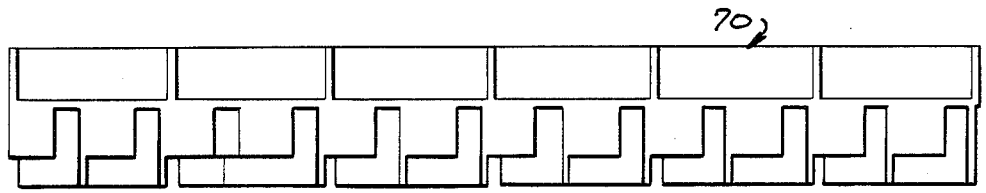
FIG. 6 is a plan view of a first type of disc pack adaptor of FIG. 5.

FIGS. 3 and 4 illustrate the cassette adaptors 50, 52 in greater detail. A VHS casette pack has a width A of about 3 cm (centimeters), a length B of about 19 cm, and a height of about 10.5 cm. Accordingly, the width D between tabs is about 3 centimeters. Each of the cassette adaptors 50, 52 has a pair of ends 62, 64 that are about 3 cm in width to closely fit in the space between a pair of tabs, and each adaptor has a length of about 19 cm to extend between opposite sides of the drawer. The bottom walls 60 of the adaptor have a much smaller thickness than the adaptor ends 62, 64. Each adaptor also has stiffening walls 65 extending perpendicular to the ribs and to the bottom walls.

When the adaptors 50, 52 are mounted as shown in FIG. 3, with three tabs 30 between them, their slot-bottom walls 60 are spaced about 11 cm apart, which approximately equals the length F of a standard audio cassette. The distance between adjacent ribs 54 is about 1.2 cm which is approximately equal to the width of an audio cassette, to closely receive it. It can be seen in FIG. 3 that eight audio cassettes can be received over the bottom 66 of the drawer to occupy a bottom area that would otherwise hold four VHS cassette packs. The drawer bottom defines a substantially horizontal plane. As seen in the plan view of FIG. 3, the floor area occupied by eight audio cassettes 20 is about 65% of the area that would be occupied by four VHS cassette packs, so that a majority of the space available for holding VHS packs would be utilized. This compares with prior systems which stored the audio packs in the same orientation as the VHS packs, and wherein only six audio packs could then be stored in the space occupied by four VHS packs, so that only about 50% of the floor area of the drawer was utilized. Thus, the present adaptors which use about 65% of the available space can store about one-third more packs in a given area than the prior art.

The particular drawer 16 has eleven tabs 30 spaced along each side, to provide twelve spaces 34 for holding twelve VHS cassette packs. The twelve spaces also can hold three pairs of adaptors, to hold a total of twenty-four audio cassette packs. The adaptors are easily installed and removed by merely pressing them down into place and lifting them out.

Referring again to FIG. 2, it can be seen that floppy disc packs 22 and CD disc packs 24 can both be stored in the drawer 16. Such storage is accomplished by the use of disc pack adaptors 70, 72 which mount on opposite sides of the drawer, in holes 74 that are spaced along the opposite sides of the drawer in its bottom. The drawer may be defined as having a centerplane 76 which lies halfway between the opposite sides of the drawer and extends along the length L of the drawer to bisect its forward and rearward ends 78, 80 and the bottom 66. The disc pack adaptors 70, 72 lie on opposite sides of their centerplane.

Figure 10:
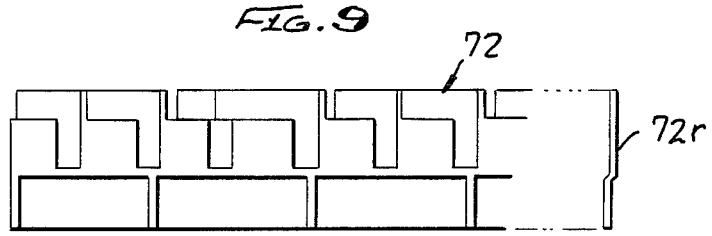
FIG. 10 is a partial plan view of a second adaptor of FIG. 5.
Figure 11:
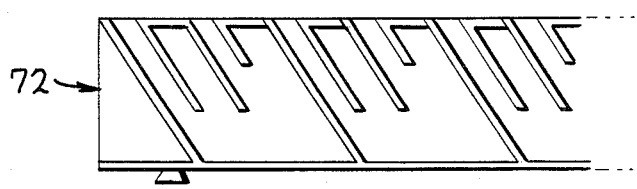
FIG. 11 is a front elevation view of the adaptor of FIG. 10.

As shown in FIG. 5, the disc pack adaptors 70, 72 are elongated along the length of the drawer, with each having ends 70f, 70r or 72f, 72r (FIG. 10, also). Each disc adaptor includes pairs of ribs 82, 84 spaced apart along the length of the adaptor to form slots 86 between them which are about as wide as the width G of a CD disc pack 24 to receive the disc pack. (One slot 88 is of double width to closely receive a double wide CD pack.) Each adaptor also has a bottom wall 90 forming the bottom of the slot, with the distance between corresponding bottom walls 90, 92 of the two adaptors spaced distance about equal to the length H of the CD pack. Considering an individual adaptor 70, the bottom wall 90 lies a distance from the centerplane 76 equal to about one-half H. The bottom walls 90, 92 form second slots 94, 96 for receiving the 5¼" floppy disc packs 22. The width of each second slot 94, 96 is about the same as the width of the floppy disc pack 22, although the slot 94, 96 is somewhat greater in width. The distance between the bottoms 95 of the second slots at the opposite adaptors is about equal to the length J of the floppy disc pack.

The CD pack 24 has a width G of about 1 centimeter and a length H of about 12 centimeters, while the floppy disc pack 22 has a width K of about 0.3 cm and a length J of about 14 cm. This allows the CD pack 24 and floppy pack 22 to be alternatively held in the same location on their disc pack adaptors. The two adaptors 70, 72 are substantially mirror images of one another.

It can be seen that the front and rear walls 97, 98 of the second slots 94, 96 are angled by an angle M of 30° from a vertical line 99 which extends normal to the drawer bottom. This results in the floppy disc packs 22 being held at an incline from the vertical. One advantage of such an incline is that it reduces the height above the bottom of the drawer, at which the top of the floppy disc pack lies. The floppy disc pack 22 has a height P of about 13.5 cm. When it extends at an angle of 30° from the vertical, the top 100 of the pack is reduced by 13½%, so it lies a distance of only about 11.5 cm above the drawer bottom. This savings in height reduces the required height Q (FIG. 1) of the cabinet 12 which holds the drawer, as measured between a top inside wall 101 and the drawer bottom or any other cover above the drawer. The height Q can be made to be only moderately greater than the height C of a video cassette pack. In addition, the rearward-upward tilt of the disc pack 22 facilitates reading the title 102 of the floppy disc pack when many of such packs are stored in the drawer. The tilt angle M is preferably at least about 20° but less than 45°.

The CD pack 24 has a height R of about 14 cm, and its orientation at an angle of 30° from the vertical reduces its height to about 12.5 cm, which reduces the required height of the cabinet. However, the title 104 on a CD pack is generally placed along the top edge of the pack. To facilitate reading the titles 104, it would be desirable to have the CD packs tilted in a forward-upward direction. This can be accomplished by interchanging the two adaptors 70, 72, so that the adaptor 72 lies on the left side of the drawer (to an observer forward of the drawer and facing the front of the drawer), and the other adaptor 70 lies on the right side of the drawer, with the slots on the adaptors facing the centerplane and each other.

Figure 7:
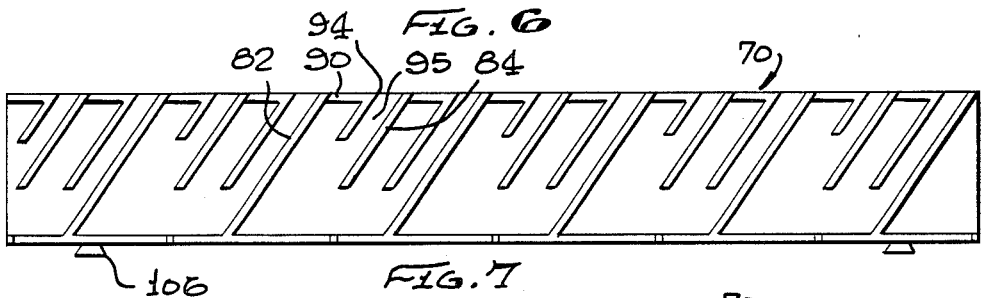
FIG. 7 is a front elevation view of the adaptor of FIG. 6.
Figure 8:
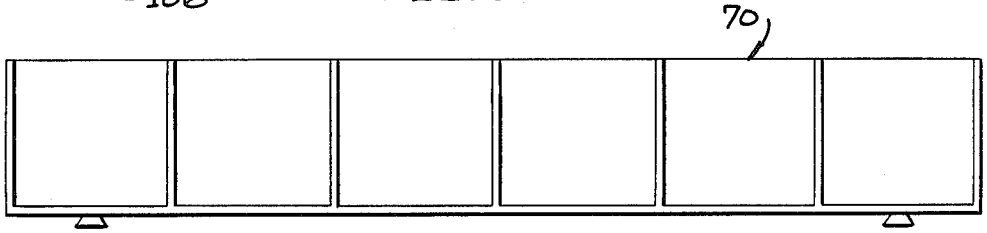
FIG. 8 is a rear elevation view of the adaptor of FIG. 6.
Figure 9:
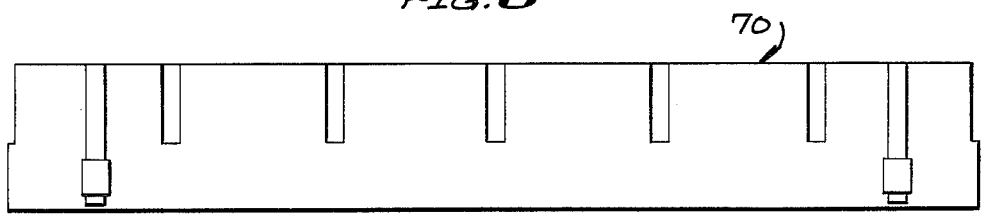
FIG. 9 is a bottom view of the adaptor of FIG. 6.

Each of the disc pack adaptors has mounting feet or keys 106 (FIG. 7) which can be mounted in corresponding keyways 74 (FIG. 3) formed in the bottom of the drawer. The keys permit each adaptor to be mounted at either side of the drawer, and with its disc pack holding first side 108 (FIG. 5) closest to the centerplane 76. Each adaptor also includes a cassette-holding second side 110 which forms auxiliary tabs 112 for holding the ends of a Beta video cassette pack. When the adaptors 70, 72 are mounted on the drawer with their cassette-holding sides 110 closest to the centerplane 76, the spacing between bottom walls 114 of the Beta cassette-holding spaces 116 are about equal to the length of Beta type cassette packs.

While the most common types of cassettes at present are VHS, Beta, and standard (full size) audio cassettes, additional sizes of cassettes have been recently introduced, including 8 mm video cassettes and digital audio cassettes. The adaptors, especially those shown in FIG. 4, can be modified to hold cassettes and/or packs of a variety of formats. Instead of holding an audio or similar cassette between two adaptors, it is possible to form spaces such as shown at 116 in FIG. 3, to hold one end of the cassette while the other end is held by an adaptor.

Thus, the invention provides a system for the storage of information storage devices such as cassette packs and disc packs, which enables a variety of such devices to be alternately stored in an efficient manner in the same drawer, tray, compartment, case, or the like. Where the drawer has largely vertical tabs at either side for holding cassettes of a first size in an orientation where they extend across the width of the drawer, adaptors can be provided that each lies in a space otherwise occupied by a first cassette. Such cassette adaptors can hold cassettes of a second size in an orientation where their length is substantially perpendicular to the length of stored first cassettes. Disc pack adaptors can also be provided, which hold disc packs in extension between opposite sides of a drawer. The disc pack adaptors can hold the disc pack at an angle of a plurality of degrees, but generally no more than 45° from the vertical, to reduce the storage height required above the bottom of the drawer, as well as to facilitate viewing of the titles of the disc packs.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for holding cassettes comprising:
    a drawer which has a drawer length and which has opposite sides spaced apart by about the length of a first size cassette pack, said drawer having at least three tabs at each side that are spaced along said drawer length to leave a plurality of first spaces each of a width about the same as the width of said first size cassette pack;
    an elongated cassette adaptor which extends between said opposite sides of said drawer and which has a pair of ends that each closely fit in said first spaces, said adaptor having a plurality of ribs spaced apart along its length to leave second spaces having widths about the same as the width of a second size cassette pack which has a predetermined width and length and which has pack ends spaced by its length, said adaptor forming bottom walls which lie between a power of said ribs and which lie adjacent to an end of a second size cassette pack that lies in one of said second spaces, each of said bottom walls being of smaller thickness than said adaptor ends which closely fit in said first spaces, whereby to store ends of the second size cassette packs.

2. The apparatus described in claim 1 including:
    a second cassette adaptor which is substantially identical to said first named adaptor;
    said adaptors each mounted to extend between said opposite sides of said drawer with its ends held in a pair of said first spaces at said opposite sides, and with said adaptors spaced along the drawer length to hold each of the opposite ends of said second cassette packs between pairs of said ribs.

3. The apparatus described in claim 1 including:
    a second adaptor which is substantially identical to said first named adaptor and extending between said opposite sides of said drawer; and wherein
    said tabs are spaced about 3 centimeters apart along each of said sides and said sides are spaced apart by about 19 centimeters to closely receive VHS cassette packs between the sides in the spaces between the tabs, and said adaptors each have a length of about 19 centimeters and their ribs are spaced about 2 centimeters apart to receive standard audio cassette packs.

4. Apparatus for use with a drawer or other type of platform which has a substantially horizontal bottom, a front, a rear, and first and second opposite sides, and which defines a substantially vertical centerplane lying halfway between said sides, for holding first packs and second packs each pack comprising an information storage device and a largely rectangular package ohlding the device, comprising:
    first and second pack adaptors detachably mounted to said opposite sides of said drawer, each adaptor including ribs spaced apart along the length of one of said drawer sides which form slots for closely holding the ends of said first packs and the ends of said second packs;
    said ribs and the walls of said slots are angled a plurality of degrees from the vertical direction;
    said pack adaptors are substantially mirror images of one another, and are detachably mountable in a first position wherein said first and second adaptors lie at said first and second sides of said drawer and in a second position wherein said first and second adaptors lie respectively at said second an first sides of said drawer, the slots of said adaptors opening towards the opposite side of the platform in either of said positions, and the ribs and slots of said adaptors angled in opposite directions from the vertical at said different positions, and with said ribs allowing a pack to lie stably angled in only one of said opposite directions from the vertical when each pack adaptor lies at a predetermined one of said sides of said drawer, whereby to allow one type of pack to be angled upward toward the front and another type toward the rear;
    each of said adaptors having a second set of ribs projecting opposite said first mentioned ribs, each adaptor mountable in a position wherein said second set of ribs extends towards said centerplane.

5. In a storage apparatus which includes a frame which has a frame length and which has opposite sides spaced apart by about the length of a first size cassette pack, said frame having a plurality of tabs at each side that are spaced along said frame length to leave a plurality of adjacent first spaces that each lie between a pair of said tabs, each first space being of a width about the same as the width of said first size cassette pack, which enables the storage of a second size cassette pack of predetermined width and length and which has opposite ends spaced by its length, the improvement comprising:
    an elongated cassette adaptor which removably extends between said opposite sides of said frame and which has a pair of ends that each closely fit in said first spaces, each of said ends of said adaptor having front and rear opposite sides spaced apart by about the spacing of said tabs, said adaptor having a plurality of ribs spaced apart along its length to leave second spaces having widths about the same as the widths of said second cassette packs, said adaptor forming bottom walls which each lie between a pair of said ribs and which lie adjacent to an end of a second size cassette pack that lies in one of said second spaces, each of said bottom walls being thinner than said ends of said adaptor, whereby to store the ends of the second size cassette packs.

6. The apparatus described in claim 5 including:
    a frame of the construction of said frame;
    a scond cassette adaptor which is substantially identical to said first named adaptor;

said adaptor each detachably mounted to extend between said opposite sides of said frame with its ends held in first spaces at said opposite sides, and with said adaptors spaced along the frame length to hold each of the opposite ends of said second cassette packs between pairs of said ribs.

7. The apparatus described in claim 5 wherein:
said adaptor includes stiffening walls extending across each of said second spaces perpendicular to said ribs and to said bottom walls.

* * * * *